United States Patent [19]

George

[11] 4,178,668

[45] Dec. 18, 1979

[54] PIPE TOOL

[76] Inventor: Leroy George, 7915 W. Orangewood, Glendale, Ariz. 85301

[21] Appl. No.: 867,604

[22] Filed: Jan. 6, 1978

[51] Int. Cl.[2] .............................................. B23P 19/04
[52] U.S. Cl. .............................................................. 29/237
[58] Field of Search ................................. 29/237, 282

[56] References Cited

U.S. PATENT DOCUMENTS

| | | | |
|---|---|---|---|
| 3,096,572 | 7/1963 | Simmons | 29/282 |
| 3,299,496 | 1/1967 | Christensen | 29/237 |
| 3,494,016 | 2/1970 | Evans | 29/237 |
| 3,571,896 | 3/1971 | Wilkenson | 29/237 |
| 3,988,819 | 11/1976 | Sato | 29/237 |

*Primary Examiner*—James L. Jones, Jr.
*Attorney, Agent, or Firm*—Gregory J. Nelson

[57] ABSTRACT

A pipe tool for assembling the spigot end of a first pipe into the hub or bell of the second pipe. A bracket configured to seat on the pipe pivotally carries a semi-circular yoke. An actuating handle is secured to the yoke. A collar member is axially displaced from the yoke and is secured to the yoke by a crank arrangement. The collar and the bracket members are adapted to be placed on adjacent pipe sections with one of the members in abutment with the hub and the other with the annular seal at the spigot end. Rotation of the yoke through the actuating handle exerts an axial force at the collar urging the pipe sections into sealing engagement.

2 Claims, 5 Drawing Figures

PIPE TOOL

The present invention relates to an apparatus for joining or sealing sections of pipe and more particularly relates to a pipe tool for applying axial forces to join sections of pipe of the type generally known as bell and spigot types.

Formerly the pipe industry utilized pipes which were joined together by placing the mating ends in engagement and applying a suitable caulking or lead material to seal the joint. The practical difficulties encountered in this type of construction are numerous in this type of construction. Pipe having a flexible or elastomeric sealing element formed as an integral part of the pipe has become common in the pipe industry. The elastomeric seal is of suitable composition, shape, and dimensions to effectively seal the pipe when mating or telescoping pipe ends are joined together. The elastomeric seal is deformed to provide a highly satisfactory seal and a strong mechanical connection between the joined sections of pipe. This type of seal is used for various types of pipe including cast iron, concrete, vitrified clay or transite pipe for water mains and sanitary sewers.

One problem in the utilization of joints of this type has been in the installation of pipe. Axial force must be applied to the pipe joints or sections to force the mating sections together to effect the seal. Conventional practice has been to manually apply the forces required to join the pipe. Use of manual tools such as, crow bars, "comg-alongs" and jacks are commonly used. Such manual devices, in many cases, are suitable for smaller diameter pipes, but are not sufficient to create the force necessary to join larger size pipe. Even with smaller diameter pipes, problems occur as workman have limited space available in trenches, so it becomes difficult to work the pipe into place. Further, breakage of the pipe is a mojor problem particularly if the pipe is concrete or vitrified clay. Since the pipe sections are expensive, the breakage of joints can represent substantial increases in the cost of the job to the owner and to the contractor in direct material costs as well in delays occasioned by having to remove broken pipe and replace the pipe with a new section.

To overcome problems of the type mentioned above, numerous tools and devices have been proposed in the prior art for joining sections of ball and spigot types. Generally, these types of devices include some type of operating lever coupled to a chain or a cable. To join the pipe, the chain is connected to a pipe by a clamp or length of chain extending around the pipe. The chain is pulled taut and the pipes are forced into mating engagement. However, even tools of this type have disadvantages or deficiencies which have prevented their acceptance in the industry. These devices generally require substantial working space and require that at least a piece of the apparatus extend around the pipe. This necessitates manual excavation to place the tool in an operating position. Confined working space often makes operation of these prior art tools difficult, if not impossible, because of their size and weight. Most of these devices are complex, heavy and unwieldy, requiring several skilled workers to operate the devices. Devices of the general type are disclosed in U.S. Pat. Nos. 3,665,579, 3,257,714, 3,927,457, and 3,486,215.

Briefly, the present invention provides a portable, lightweight and easily operable apparatus or tool for joining and seating pipe sections of various diameters having an integral gasket or elastomeric seal. The pipe tool of the present invention comprises a semi-circular collar member and a bracket member which are axially spaced apart, adapted to be placed at either side of a pipe joint. One of the members engages the hub or bell of one pipe section, and the other section is adapted to engage the annular seal at the spigot end of the mating pipe. A yoke is pivotally attached to the bracket. The yoke connected to the collar member by one or more links forming a crank assembly. An operating lever is attached or secured to the yoke and when the yoke is pivotally rotated, an axial force is applied causing the bell and spigot to be moved into sealing engagement.

The above-mentioned advantages and features of the present invention will be readily understood from the following description of the invention which may be had by reference to the specific embodiments illustrated in the appended drawings, which drawings form a part of the specification as follows.

Figure 1:
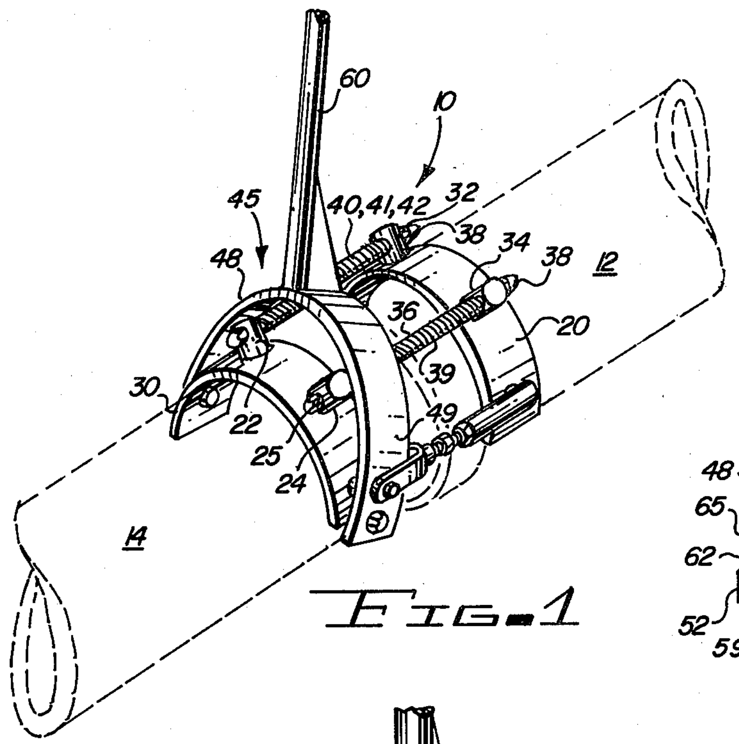
FIG. 1 is a perspective view of the pipe tool of the present invention shown in position on adjoining pipe sections, the pipe sections being shown in dotted.
Figure 4:
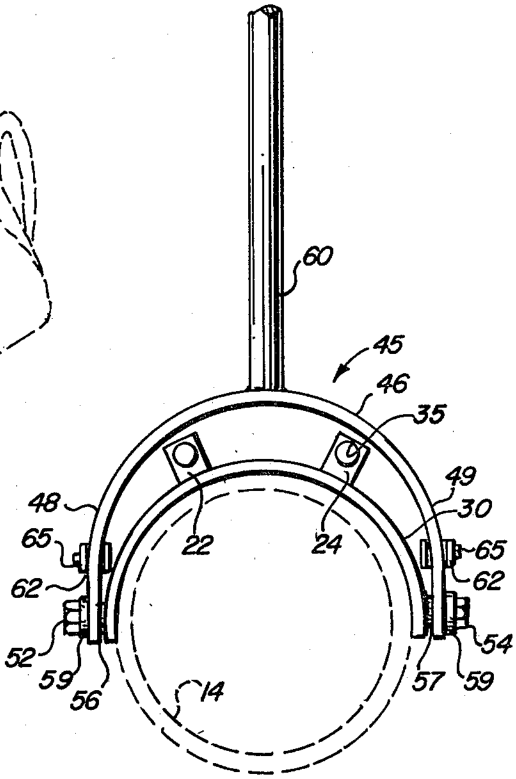
FIG. 4 is an end view of the pipe tool of the present invention.

Referring to the drawings, a preferred embodiment of the pipe tool generally designated by the numeral 10, according to the present invention, is disclosed. In the drawing, two sections of bell and spigot pipe 12 and 14 are illustrated. Pipe section 12 has a bell or hub 16 and pipe section 14 has a spigot end 18 which, in the assembled position, is received within hub 16. An annular sealing member 19 is provided at spigot end 18. Sealing member 19 is a suitable elastomeric material which effectively seals the joint when the pipe ends are engaged.

Pipe tool 10 includes a semi-circular collar 20 which is curved and has an inner surface generally complementary with the outer surface of the pipe to be joined so the collar can be seated on the pipe as shown in FIGS. 1 to 4. A pair of post members 32 and 34 are secured to the exterior of collar 20 angularly displaced approximately 45° from the vertical center line of the device as best shown in FIG. 1. Each of the posts 22 and 24 are provided with an axial bore 36.

A semi-circular bracket 30 is axially spaced from collar 20. Bracket 30 is similar in configuration to collar 20 and has an interior surface which is adapted to complementarily engage the exterior surface or outer diameter of the section of a pipe. Posts 22 and 24 are welded or otherwise secured to the exterior surface of collar 20 and each has a bore 35 adapted to align with bores 36 in posts 22 and 24 on axially spaced bracket 30. A spacer rod 36 extends between the bores 34 and 24 in oppositely spaced post members 34 and 24. The outer ends of rod 36 are secured by a cap nut 38. A compression spring 39 is disposed about the rod 36 extending between the post members 24 and 34. Similarly, another spacer assembly 40 including a rod 41 and spring 42 extends between oppositely spaced posts 22 and 32. The spacer assemblies serve to maintain the collar and bracket in alignment for easy placement and positioning of the tool.

The device of the present invention is actually through movement of yoke 45. Yoke 45 includes an arcuate or bight section 46 and arm sections 48 and 49 disposed at either side of bight section 46. Yoke 45 is pivotally secured to saddle 30 by bolts 52 and 54 extending through bores in lower portions of arm sections 48 and 49 and in engagement with spacers 56 and 57 interposed between the bracket and yoke. A washer 59 is interposed between the bolt and each of the bracket arms 48 and 49 to facilitate the free pivotal action of the yoke. Actuating arm 60, which is shown as a tubular steel member, is secured to the bight portion of yoke and extends vertically from the yoke.

A pair of crank assemblies 80 connects the yoke at opposite sides at arms 48 and 49 to the collar 20. In position the crank assemblies extend axially along the sides of the pipe sections to be joined. Each of the crank assemblies are identical so a description of one is believed sufficient. Each of the crank assemblies 80 includes a clevis 62 having ends 64 extending around the arms 48 and 49. A clevis pin 65 extends through the ends of the clevis 63 and 64 and the yoke arms at a location above and axially displaced from bolts 52 and 54. Clevis 65 is secured at its inner end by a cotter key or similar fastener. The outer end of the clevis assembly is provided with an internal threaded bore 66. A threaded rod 68 engages the internal bore 66. A hub 69 is secured near each of the terminal ends of collar 20. Pivot socket 70 is pivotally attached to hub 69 and has an internal bore 72 which receives the one end of threaded rod 68. By loosening threaded nuts 78 and 77 and removing pivot pin 65, securing the clevis in place, the clevis can be turned to adjust the relative spacing between the collar and saddle. Lock nut 77 and 78 can be tightened against respective clevis and socket ends and after adjustment and the clevis pinned in position to the bracket 30.

The pipe tool 10 of the present invention can be fabricated from a wide variety of materials. The pipe tool may be fabricatd from tool steel with the bracket, yoke and collar being formed from flat strips of steel plate formed into the semi-circular or curved configuration shown. These parts may be similarly cast from a high quality tool steel or aluminum which is suitably heat treated or hardened.

Figure 2:
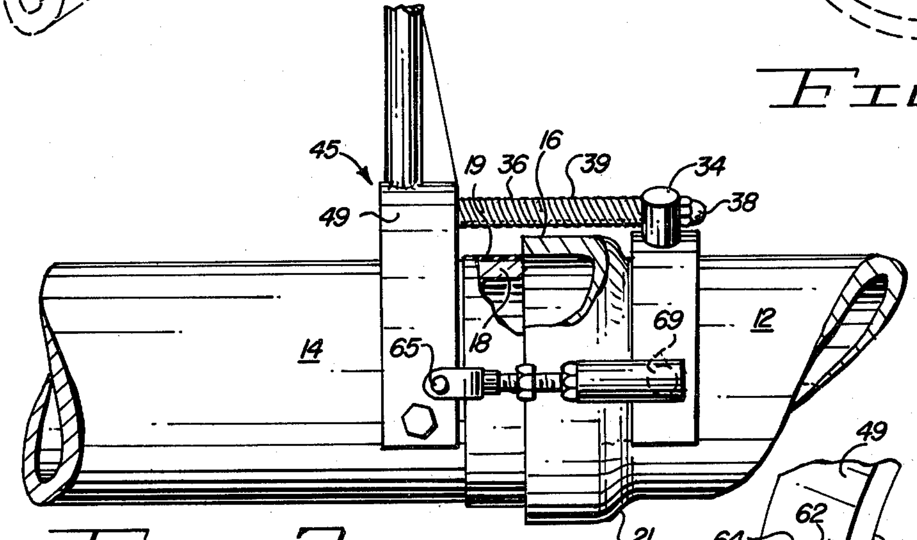
FIG. 2 is a side elevational view of the pipe tool of the present invention in position on adjoining pipe sections in the initial position of the pipe joining operation.
Figure 5:
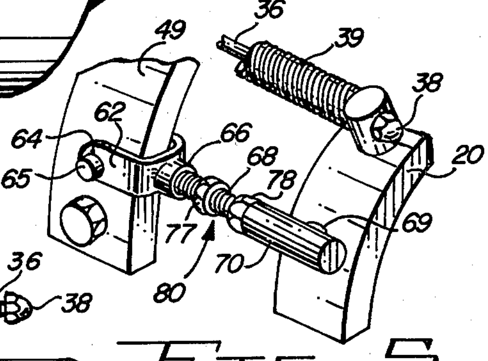
FIG. 5 is a perspective view illustrating the details of the crank assembly connecting the collar and yoke assembly.
Figure 3:
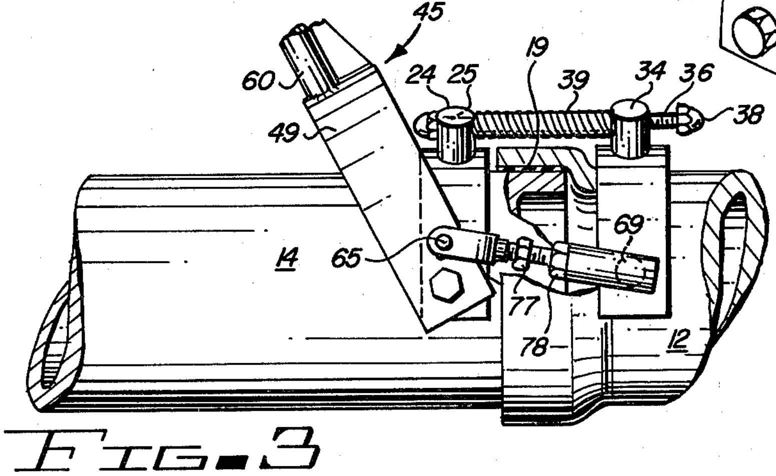
FIG. 3 is a side elevational view showing the pipe tool of the present invention in position on adjacent pipes at the completion of the pipe joining operation.

The present invention will be better understood from the following description of operation of the device. The pipe tool of the present invention generally can be provided to the user in several sizes. The size of the collar and bracket should correspond approximately to the diameter of the pipe to be installed, although a precise or tight fit is not necessary. Two lengths of pipe 12 and 14 are positioned as shown in FIG. 2 with the spigot end 18 of section 14 axially aligned or engaging the bell 16 of section 12. The pipe tool 10 is placed over the adjacent pipe joints with collar 20 positioned immediately adjacent hub 16 and engaging the shoulder 21 of the hub and bracket 30 abuting annular seal 19 of pipe section 14. The relative spacing between collar 20 and bracket 30 can be adjusted at each crank assembly by removing clevis pin 65 and loosening lock nuts 77 and 78 to permit clevis 62 and socket 70 to be turned on threaded rod 68 to the desired position. Lock nuts 77 and 78 are tightened and the clevis 62 is positioned on yoke 45 and pinned in place. The actual distance between the bracket and collar should permit the bracket 30 to be positioned immediately adjacent annular flange 20 as best seen in FIG. 2. Yoke 45 is pivoted as shown in FIG. 3 by rotation of handle 60. Rotation of yoke 46 will move the clevis pivot point on the yoke at pin 65 to an over-the-center position with respect to pivot points 52 and 54. This displacement exerts an axial joining force through crank assemblies 80 which is transferred to the shoulder 21 of the hub displacing pipe joint 12 leftwardly as viewed in FIG. 3 working against the force applied by bracket 30 to seal 19. This movement will bring the pipe sections into sealing engagement. During this operation, springs 39 are compressed and when handle 60 is again returned to a vertical position, the spring serves to assist to return the bracket and collar to their normal positions.

The next pipe in the pipeline can be laid in place and joined in the manner described above. Note that the tool for the present invention can be oriented in either position, that is the tool can be reversed with the yoke and bracket position adjacent the pipe hub and the yoke pivotedly rightwardly as shown in FIG. 3.

It will be apparent that the pipe tool of the present invention provides substantial advantages over the bulky unwieldy devices of the prior art. The pipe tool of the present invention can be operated by a single workman with ease as the substantial lever arm provided by the yoke handle translates into substantial axial force to urge the pipes together. Further, the device exerts a direct axial force to prevent misalignment or breaking. The tool is engaged about the pipes from the upper side of the pipe. It is not necessary to place any clamping devices about the pipe and chains or similar pulling devices are not required. This is significant because, in many cases, the laborer can perform the joining operation without having to work within the confines of a trench, thus minimizing the possibiltiy of injury to the worker from collapsing trench sidewalls.

As pointed out above, the apparatus or pipe tool of the present invention can be constructed of any suitable material such as, steel, or cast aluminum or material having sufficient strength or durability to withstand the forces generally encountered in joining pipe sections. In some cases, for pipe sections of small diameter, the components could be constructed of lightweight material such as, aluminum or aluminum alloy while a tool adapted for use with larger diameter pipe sizes would be formed of steel or similar material.

Various modifications and changes will become obvious to those skilled in the art. It is intended that these changes and modifications are intended to be encompassed in the spirit and scope of the appended claims and that the invention described herein and shown in the figures of the accompanying drawings are illustrative only and are not intended to limit the scope of the invention.

I claim:

1. An apparatus for moving the hub end of a first pipe section into sealing engagement with the spigot end of second pipe section having an annular seal thereon when said ends are placed in abutment, said apparatus comprising:

(a) a first generally semi-circular collar adapted to complementarily engage the outer diameter of said first section of pipe in a position in abutment with said hub;

(b) a generally semi-circular bracket adapted to complementarily engage the outer diameter of said second pipe section at a position immediately adjacent and in abutment with said annular seal;

(c) a yoke having an intermediate bight section and oppositely disposed arm sections positioned at opposite ends of said bight section and depending therefrom, each of said arms being pivotally connected to said bracket at opposite sides of said bracket along a common axis which is transverse to said pipe sections;

(d) handle means carried on said yoke for pivotally actuating said yoke;

(e) compressible means extending between said bracket means and said collar means for maintaining said bracket and collar in proper spaced relationship; and (f) a crank assembly interconnecting said yoke and said collar means, said crank assembly comprising:

(i) a clevis pivotally attached to said yoke means;

(ii) a pivot socket carried on said collar; and (iii) adjustable means interconnecting said clevis, and said collar for adjusting the relative spacing between said collar and said bracket whereby pivotal movement of said crank will exert a generally axial pipe joining force through said crank assembly urging said pipe sections into sealing engagement.

2. An apparatus for moving the hub end of a first pipe section into sealing engagement with the spigot end of second pipe section having an annular seal thereon when said ends are placed in abutment, said apparatus comprising:

(a) a collar means adapted to complementarily engage the outer diameter of said first section of pipe in a position in abutment with said hub;

(b) a bracket adapted to complementarily engage the outer diameter of said second pipe section at a position immediately adjacent and in abutment with said annular seal;

(c) a yoke having an intermediate bight section and oppositely disposed arm sections positioned at opposite ends of said bight section and depending therefrom, each of said arms being pivotally connected to said bracket at opposite sides of said bracket along a common axis which is transverse to said pipe sections;

(d) handle means carried on said yoke for pivotally actuating said yoke;

(e) compressible means extending between said bracket means and said collar means for maintaining said bracket and collar in proper spaced relationship; and (f) crank means interconnecting said yoke and said collar means, said crank means including adjustable means for selectively adjusting the relative spacing between said collar means and said bracket whereby pivotal movement of said crank will exert a generally axial pipe joining force through said crank means urging said pipe sections into sealing engagement.

* * * * *